(12) United States Patent
Muchherla et al.

(10) Patent No.: US 12,340,126 B2
(45) Date of Patent: *Jun. 24, 2025

(54) WORKLOAD-BASED SCAN OPTIMIZATION

(71) Applicant: Micron Technology, Inc., Boise, ID (US)

(72) Inventors: Kishore Kumar Muchherla, San Jose, CA (US); Eric N. Lee, San Jose, CA (US); Jeffrey S. McNeil, Nampa, ID (US); Jonathan S. Parry, Boise, ID (US); Lakshmi Kalpana Vakati, Fremont, CA (US)

(73) Assignee: Micron Technology, Inc., Boise, ID (US)

(*) Notice: Subject to any disclaimer, the term of this patent is extended or adjusted under 35 U.S.C. 154(b) by 0 days.

This patent is subject to a terminal disclaimer.

(21) Appl. No.: 18/623,881

(22) Filed: Apr. 1, 2024

(65) Prior Publication Data

US 2024/0248646 A1 Jul. 25, 2024

Related U.S. Application Data

(63) Continuation of application No. 17/691,014, filed on Mar. 9, 2022, now Pat. No. 11,977,778.

(51) Int. Cl.
*G06F 3/06* (2006.01)
(52) U.S. Cl.
CPC .......... *G06F 3/0659* (2013.01); *G06F 3/0604* (2013.01); *G06F 3/0619* (2013.01); *G06F 3/064* (2013.01); *G06F 3/0679* (2013.01)

(58) Field of Classification Search
CPC ...... G06F 3/0604; G06F 3/061; G06F 3/0619; G06F 3/0625; G06F 3/064; G06F 3/0659; G06F 3/0679; G06F 3/0688
See application file for complete search history.

(56) References Cited

U.S. PATENT DOCUMENTS

| | | |
|---|---|---|
| 2003/0128618 A1 | 7/2003 | Harari et al. |
| 2011/0276746 A1 | 11/2011 | Pruthi et al. |
| 2014/0157065 A1 | 6/2014 | Ong |
| 2014/0185383 A1* | 7/2014 | Shibata .................. G11C 16/10 365/185.17 |
| 2019/0369871 A1 | 12/2019 | Gaskill et al. |
| 2022/0083256 A1 | 3/2022 | Muthiah |
| 2022/0157387 A1 | 5/2022 | Hara et al. |

* cited by examiner

*Primary Examiner* — Larry T Mackall
(74) *Attorney, Agent, or Firm* — Lowenstein Sandler LLP

(57) ABSTRACT

A method performed by a processing device receives a plurality of write operation requests, where each of the write operation requests specifies a respective one of the memory units, identifies one or more operating characteristic values, where each operating characteristic value reflects one or more memory access operations performed on a memory device, and determines whether the operating characteristic values satisfy one or more threshold criteria. Responsive to determining that the operating characteristic values satisfy the one or more threshold criteria, the method performs a plurality of write operations, where each of the write operations writes data to the respective one of the memory units, and performs a multiple-read scan operation subsequent to the plurality of write operations, where the multiple-read scan operation reads data from each of the memory units.

20 Claims, 7 Drawing Sheets

WORKLOAD-BASED SCAN OPTIMIZATION

RELATED APPLICATIONS

This application is a continuation of U.S. patent application Ser. No. 17/691,014, filed Mar. 9, 2022, the entire contents of which are hereby incorporated by reference herein.

TECHNICAL FIELD

Embodiments of the disclosure relate generally to memory sub-systems, and more specifically, relate to workload-based scan optimization in memory sub-systems.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various implementations of the disclosure. The drawings, however, should not be taken to limit the disclosure to the specific embodiments, but are for explanation and understanding only.

DETAILED DESCRIPTION

Figure 1:
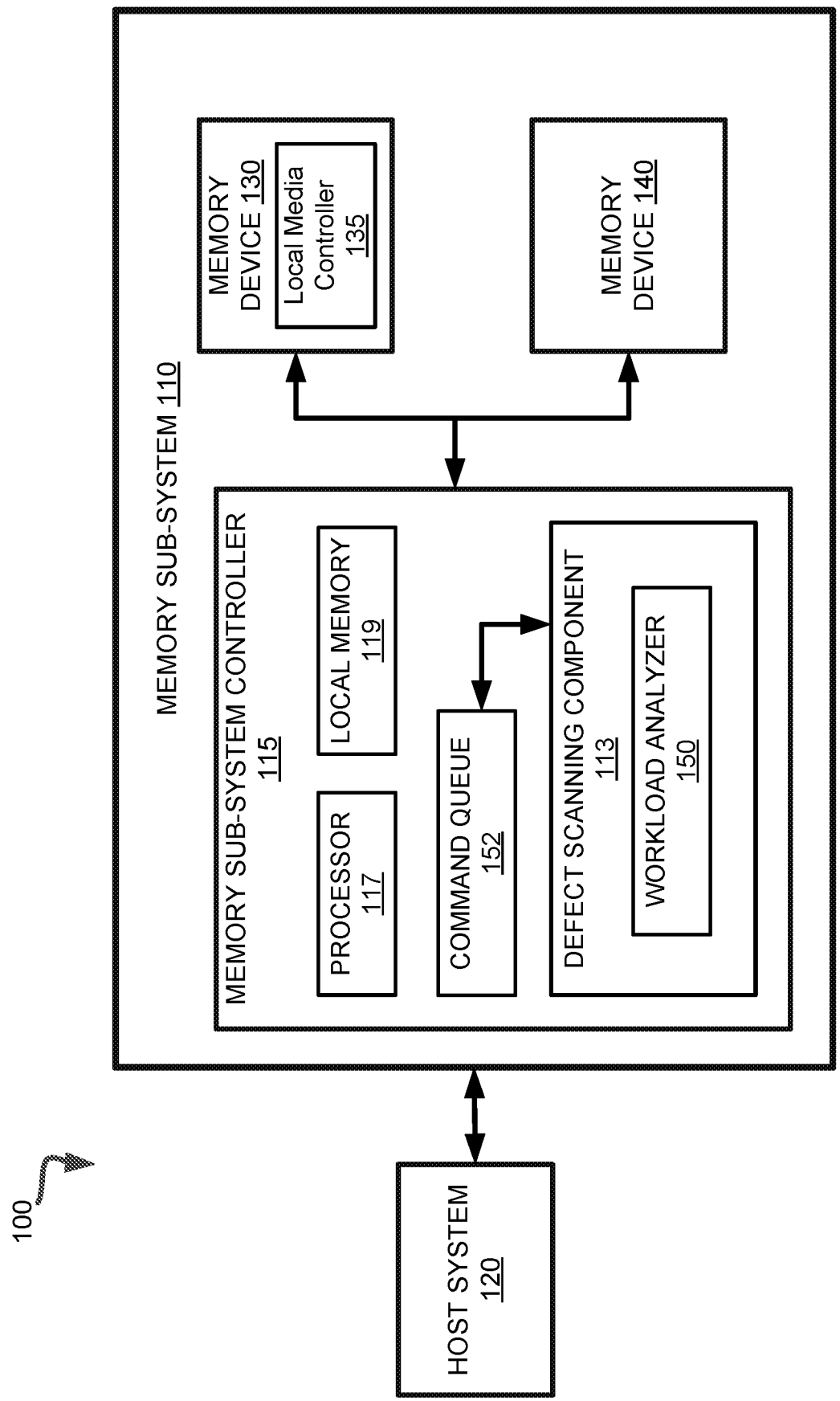
FIG. 1 illustrates an example computing system that includes a memory sub-system in accordance with some embodiments of the present disclosure.

Aspects of the present disclosure are directed to performing workload-based scan optimization in a memory sub-system. A memory sub-system can be a storage device, a memory module, or a combination of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a three-dimensional cross-point ("3D cross-point") memory device that includes an array of non-volatile memory cells. A 3D cross-point memory device can perform bit storage based on a change of bulk resistance, in conjunction with a stackable cross-gridded data access array. Another example is a negative-and (NAND) memory device. Other examples of non-volatile memory devices are described below in conjunction with FIG. 1. A non-volatile memory device is a package of one or more dies. Each die can consist of one or more planes. For some types of non-volatile memory devices (e.g., NAND devices), each plane consists of a set of physical blocks. Each block consists of a set of pages. Each page consists of a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

A memory device can be made up of bits arranged in a two-dimensional or three-dimensional grid. Memory cells are etched onto a silicon wafer in an array of columns (also hereinafter referred to as bitlines) and rows (also hereinafter referred to as wordlines). A wordline can refer to one or more rows of memory cells of a memory device that are used with one or more bitlines to generate the address of each of the memory cells. The intersection of a bitline and wordline constitutes the address of the memory cell. A block hereinafter refers to a unit of the memory device used to store data and can include a group of memory cells, a wordline group, a wordline, or individual memory cells. One or more blocks can be grouped together to form a plane of the memory device in order to allow concurrent operations to take place on each plane. A memory device can be called a "drive", which has multiple dies layered in multiple "decks."

A read operation can be performed using a signal (e.g., applied to a wordline of the memory array) having a read voltage level. The read threshold voltage level or value (herein the "read voltage level") can be a particular voltage that is applied to memory cells of a memory device to read the data stored at the memory cells. For example, if a threshold voltage of a particular memory cell is identified as being below the read voltage level that is applied to the particular memory cell, then the data stored at the particular memory cell can be a particular value (e.g., '1') and if the threshold voltage of the particular memory cell is identified as being above the read voltage level, then the data stored at the particular memory cell can be another value (e.g., '0'). Thus, the read voltage level can be applied to memory cells to determine values stored at the memory cells.

In some memory sub-systems, when the threshold voltage programming distributions of a memory cell change, using the same read voltage level for read operations can result in read errors, thus resulting in retries, which degrades system performance. For example, a memory cell can be programmed to have a threshold voltage below the read voltage level. The programmed threshold voltage can change over time and can shift to be above the read voltage level. For example, the threshold voltage of the memory cell can shift from initially being below the read voltage level to being above the read voltage level. As a result, when the read voltage level is applied to the memory cell, the data stored at the memory cell can be misread or misinterpreted to be at a wrong value as compared to the value as originally stored when the threshold voltage had not yet shifted.

For certain memory types (i.e., for memory sub-systems employing certain types of storage media), error rates can vary over time. In particular, some non-volatile memories have threshold voltage programming distributions that move or "drift" higher over time. At a given read voltage level (i.e., a value of the voltage applied to a memory cell as part of a read operation), if the threshold voltage programming distributions move, then certain reliability statistics can also be affected. One example of a reliability statistic is a bit error rate (BER). The BER can be defined as the ratio of the number of erroneous bits to the number of all data bits stored in a unit of the memory sub-system, where the unit can be the entire memory sub-system, a die of memory device, a collection of codewords, or any other meaningful portion of the memory sub-system.

Data loss can occur in memory sub-systems as a result of defects or intrinsic stresses in memory cells, or as a result of other causes, such as sudden power loss. Storage sub-systems can detect data loss by performing scan operations that check the integrity of memory units, such as pages. Scans can involve reading back at least a portion of each memory unit (e.g., page) to which user data has been written, and verifying that the user data read back corresponds to the data that was written. Scans can be performed in conjunction with temporary Redundant Array of Independent Nodes (RAIN) parity scheme to perform defect detection (e.g., by determining whether each memory unit has a defect), other types of error detection, and/or to detect intrinsic stresses of memory cells of each sub-block, in the case of non-defect scans. If the scanned sub-blocks are error-free, their integrity is intact and no corrective action need be taken. In Temporary RAIN schemes, RAIN parity data can be retained by the system firmware until the NAND unit is deemed safe from defects. This is accomplished by scanning the unit of data after a certain number of pages are programmed in a block. If defects are encountered while pages in a block are programmed, the scan operation will detect these defects in form of higher BER.

Scan operations can verify user data by performing a health check. A health check can include, for example, an error check or a parity check. An error check can be performed by measuring the voltage separation between threshold voltage distributions. In healthy programmed distributions, zero and one bit values are characterized by separate threshold voltage distributions. Distributions can overlap because of defects or intrinsic stresses resulting in higher bit error rate, for example. An error check scan can thus be performed by measuring the extent of distribution overlap. As another example, to perform a parity check, the storage sub-system can calculate parity data for user data being stored in a memory unit, store the parity data and user data in the memory unit, and use the parity data to verify the user data during a scan. Storing data in the memory unit can cause the data to be written to a memory device. The storage sub-system can then perform a parity scan after storing the user data in the memory unit. The parity scan can verify that the user data is stored correctly in the memory unit by reading the user data and the stored parity data from the memory unit, running it through an ECC decoder, correcting the user and stored parity data using ECC decoding, and comparing the corrected user and stored data with the user and corrected data read from the memory unit.

Performing scanning involves significant processing overhead, and can thus reduce memory sub-system performance. For example, scanning can consume resources of the memory sub-system controller and bandwidth of a local media controller of the memory device (e.g., NAND). As another example, the use of memory sub-system bandwidth by the scans can also increase memory sub-system latency for host reads and writes. Since the memory sub-system performs additional access operations for the scans, less bandwidth and fewer processing resources are available for reading and writing user data, resulting in reduction of throughput and/or latency of the memory sub-system.

Existing memory sub-systems can mitigate the throughput penalty resulting from scans for some workloads by combining multiple separate scan operations performed on different memory units into a single "multiple-read" scan operation that reads multiple memory units. Instead of performing a scan operation after each write operation, a number N of scans can be replaced with a single scan operation that is performed after N write operations. The single scan operation can perform N read operations to verify the data written to N pages by the N write operations. Combining the scan operations in this way can increase throughput because read setup (e.g., prologue) and clean-up (e.g., discharge) operations can be performed once for two or more reads in a multiple-read scan operation (e.g., one setup, clean-up pair), instead of once for each of the separate scan operations (e.g., N setup, clean-up pairs). Reducing the number of setup and clean-up operations reduces the amount of bandwidth used by the scans and accordingly increases throughput.

However, combining multiple scan operations into a single scan operation can also increase the latency of the scan operations, since the scan operation for a write is not performed until after multiple (e.g., N) writes. Accordingly, data written by a write operation can be unavailable for reading by an application until up to N writes and one multiple-read scan operation have been performed, instead of until one write and one single-read scan operation when multiple scan operations are not combined.

The increased scan latency that results from combining scan operations into multiple-read scan operations can have a negative impact on performance of the memory sub-system for certain workloads. For workloads that are characterized by slower rates of writes (e.g., of less data, less frequently, and/or at varying rates), the increased response time resulting from combining multiple scans into a single scan operation can result in a lower quality of service (e.g., increased response times). Further, for workloads that are characterized by slower writes, the time between a write to a memory unit and the subsequent scan operation can be longer for some memory units than others. Thus, in slower workloads, different memory units can be written at substantially different times. As time passes, memory units that are not written can be adversely affected by charge loss or other intrinsic stress. Such charge loss or other stress can result in larger raw bit error rate for a memory unit before the scan measures the health (e.g., charge loss and data validity) of the memory unit. Thus, if the time between write and scan is sufficiently long, increased bit error rates can occur. The increased bit error rate can cause an increased scan failure rate. As such, combining scan operations into multiple-read scan operations can have undesirable effects on system operation for workloads characterized by slower writes. In contrast, for bulk, e.g., higher write rate, workloads, the memory units written to have similar age-related characteristics, since those memory units are written at similar times. Thus, combining scan operations into multiple-read scan operations is less likely to cause an increased scan failure rate for higher write rate workloads.

Aspects of the present disclosure address the above and other deficiencies by using a scanning technique that determines, based on workload characteristics, whether to combine multiple single-read scan operations into a single multiple-read scan operation and perform the multiple-read scan operation after a sequence of writes, or to use a single-read scan operation after each write. A scanning component analyzes characteristics of the workload that indicate whether the workload is characterized by bursts of writes, which are at relatively high write rates, by writes of a relatively large amount of data at a substantially constant rate, or by slower rates of writes. Slower rates of writes can also include a mix of different write rates. Bursts of writes can occur when, for example, data is written at or above a threshold rate, and/or at least a threshold amount of data is written in less than a threshold amount of time. If the workload is characterized by bursts of writes, then the scanning component can perform a multiple-read scan operation after a sequence of writes to increase throughput. Alternatively, if the workload is characterized by slower rates of writes, then the scanning component can perform a single-read scan operation after each write operation (e.g., prior to a next write operation) to maintain low latency and low error rates.

The scanning component can use one or more operating characteristics of the memory sub-system, and respective threshold criteria for the characteristics, to determine whether the workload is characterized by bursts of writes or by slower writes. If the operating characteristics satisfy the threshold criteria, then the workload is characterized by bursts of writes, and the scanning component can use multiple-read scans after sequences of consecutive writes to improve throughput. Otherwise, if the operating characteristics do not satisfy the threshold criteria, then the workload is characterized by slower rates of writes, and the scanning component can use a per-write scan after each write to maintain quality of service (e.g., low latency) and low scan failure rate.

The operating characteristics can include a number of sequential Logical Block Addresses (LBAs), a command queue depth, and a transfer size. These operating characteristics can be determined by monitoring a memory sub-system command queue through which write operations pass, for example. The number of sequential LBAs can be a count of how many consecutive write operations specify LBAs that correspond to logical blocks stored at sequential memory addresses. The queue depth can be a number of commands in the command queue, and the transfer size can be a measure of how much data is written by each write operation, or a measure of an amount of data written over a specified period of time by one or more write operations.

If at least one of the operating characteristics exceeds an associated threshold value, such as a threshold number of sequential LBAs, a threshold queue depth, or a threshold transfer size, the scanning component can use multiple-read scans after sequences of consecutive writes. Otherwise, if none of the operating characteristics exceeds the associated threshold value, then the scanning component can use a per-write scan after each write.

Advantages of the present disclosure include, but are not limited to, dynamic selection of the type of scan based on workload, so that throughput is improved for burst write traffic by using multiple-read scan operations, while quality of service (e.g. low latency) and low scan error rate are maintained for workloads characterized by slower rates of writes by using single-read scan operations. The workload characteristics can be evaluated as the workload is received during operation of the memory sub-system, and the type of scan can be changed between multiple-read scan operations and single-read scan operations in response to changing workload characteristics. The disclosed techniques improve throughput for workloads that can benefit from combining multiple scan operations, while maintaining low latency and low scan failure rates for other types of workloads. Further, using multiple-read scan operations for burst write traffic reduces read disturb stress, since fewer read-related operations are performed. Performing fewer read-related operations also decreases the amount of energy used and reduces low-power state entry time, thereby increasing scan throughput.

The principles of the present disclosure reduce the number of setup and clean-up operations required to perform scanning of memory units, and also reduce the amount of data required to be processed during error checking of data read from the memory units. Not only are resources reduced that are required of the memory sub-system controller to perform the scanning, but bandwidth consumption by a local media controller of the memory device is also reduced. Other advantages will be apparent to those skilled in the art of scanning of memory units within a memory sub-system discussed hereinafter.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and a non-volatile dual in-line memory module (NVDIMM).

The computing environment 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. The host system 120 uses the memory sub-system 110, for example, to write data to the memory sub-system 110 and read data from the memory sub-system 110. As used herein, "coupled to" generally refers to a connection between components, which can be an indirect communicative connection or direct communicative connection (e.g., without intervening components), whether wired or wireless, including connections such as electrical, optical, magnetic, etc.

The host system 120 can be a computing device such as a desktop computer, laptop computer, network server, mobile device, a vehicle (e.g., airplane, drone, train, automobile, or other conveyance), Internet of Things (IOT) devices, embedded computer (e.g., one included in a vehicle, industrial equipment, or a networked commercial device), or such computing device that includes a memory and a processing device. The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system 120 and the memory sub-system 110. The host system 120 can further utilize an NVM Express (NVMe) interface to access the memory components (e.g., memory devices 130) when the memory sub-system 110 is coupled with the host system 120 by the PCIe interface. The physical host interface can provide an interface for passing control, address, data, and other signals between the memory sub-system 110 and the host system 120.

The memory devices can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased.

Although non-volatile memory components such as 3D cross-point type memory are described, the memory device 130 can be based on any other type of non-volatile memory, such as negative-and (NAND), read-only memory (ROM), phase change memory (PCM), self-selecting memory, other chalcogenide based memories, ferroelectric random access memory (FeRAM), magneto random access memory (MRAM), negative-or (NOR) flash memory, and electrically erasable programmable read-only memory (EEPROM).

One type of memory cell, for example, single level cells (SLC) can store one bit per cell. Other types of memory cells, such as multi-level cells (MLCs), triple level cells (TLCs), and quad-level cells (QLCs), can store multiple bits per cell. In some embodiments, each of the memory devices 130 can include one or more arrays of memory cells such as SLCs, MLCs, TLCs, QLCs, or any combination of such. In some embodiments, a particular memory component can include an SLC portion, and an MLC portion, a TLC portion, or a QLC portion of memory cells. The memory cells of the memory devices 130 can be grouped as pages or codewords that can refer to a logical unit of the memory device used to store data. With some types of memory (e.g., NAND), pages can be grouped to form blocks. Some types of memory, such as 3D cross-point, can group pages across dice and channels to form management units (MUs).

The memory sub-system controller 115 can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical block address and a physical block address that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The controller 115 includes a scanning component 113 that performs scanning using multiple-read scan operations if one or more threshold criteria indicate that the workload is characterized by bursts of writes. Bursts of writes can occur, for example, when writing media data, such as video files. The threshold criteria can be based on one or more operating characteristics of the memory sub-system 110. The characteristics of the memory subsystem 110 can be determined by a workload analyzer 150. The defect scanning component 113 can determine, by evaluating the threshold criteria using the characteristics of the memory sub-system, whether to combine multiple single-read scan operations into a multiple-read scan operation and perform the multiple-read scan operation after a sequence of writes, or to use a single-read scan operation after each write. The result of evaluating the threshold criteria can indicate whether the write workload processed by the memory sub-system controller 115 is characterized by bursts of writes or by slower rates of writes.

The memory sub-system 110 can receive a write operation request from the host system 120. Alternatively, a write operation request can be generated by the memory sub-system controller 115, e.g., to write metadata or other system information to a memory device. Each write operation can write data to a respective memory unit, which can be identified based on a logical address specified in a write operation request or based on a physical address determined by the memory sub-system 110. The defect scanning component 113 can retrieve the write operation requests from a command queue 152, for example. The command queue 152 can store one or more commands, such as write operation request, read operation requests, or other commands, which can be added to the command queue 152 by the memory sub-system controller 115 or other component of the memory sub-system 110. The command queue 152 can have a depth, which can be a number of commands in the queue at a particular time or a maximum number of commands that are permitted to be in the queue. For example, the term "queue depth" as used herein can refer to a number of commands in the queue 152 at a particular time, and the queue depth can be less than or equal to a maximum queue depth. The queue depth can be a number of outstanding commands that are waiting to be executed by the memory sub-system controller 115. The queue depth can depend on how many commands the host system sends before receiving a result of one of the commands. As an example, the queue depth can be 1, 4, 6, 32, 128, 256 or other number of commands. Larger values of the queue depth, e.g., 32, 128, or 256, can indicate that the memory sub-system 110 is performing bursts of memory access operations. The memory sub-system controller 115 can remove a command from the command queue 152 and perform one or more operations specified by the command, such as write operations or read operations.

The workload analyzer 150 can identify one or more operating characteristic values that are based on memory access operations performed by the memory sub-system controller 115. That is, the operating characteristics can reflect one or more memory access operations performed on the memory device 130 or 140. The memory access operations can be read operations or write operations, for example. The defect scanning component 113 can determine whether the operating characteristic values satisfy one or more threshold criteria and, if so, can cause the memory sub-system to perform a sequence of multiple write operations followed by a multiple-read scan operation.

The threshold criteria can include a Sequential Logical Block Addresses (LBAs) criterion, in which case the operating characteristic values can include a plurality of logical block addresses. Each logical block address is associated with one of the memory access operations, and the one or more threshold criteria can be based on how many of the logical block addresses are sequential logical block addresses. For example, the operating characteristic values can satisfy the threshold criteria if the logical block addresses includes at least a threshold number of sequential logical block addresses.

As another example, the operating characteristic values can include a depth of a command queue 152, in which case the operating characteristic values can satisfy the threshold criteria if the depth of the command queue 152 is at least a threshold depth. In another example, the operating characteristic values can include at least one data transfer size specified by at least one of the memory access operations, in which case the operating characteristic values can satisfy the threshold criteria if the data transfer size is at least a threshold data transfer size. As another example, the threshold criteria can be based on a product of the data transfer size and the depth of the command queue 152.

If the defect scanning component 113 determines that the operating characteristic values satisfy one or more threshold criteria, then the defect scanning component 113 can cause the memory sub-system 110 to combine multiple single-read scan operations into a multiple-read scan operation and perform the multiple-read scan operation after a sequence of writes. To combine multiple single-read scan operations, the defect scanning component 113 can receive a plurality of write operation requests (e.g., in the command queue 152) and perform a plurality of write operations, each of which is specified by a respective one of the write operation requests and writes data to the respective one of the memory units. The defect scanning component 113 can then performing a scan operation that reads data from each of the memory units and verifies the data read from each memory unit. The scan operation can determine whether each memory unit has a defect by performing a health check on the data read from the memory unit. The defect scanning component 113 can also perform other scan-related operations. For example, based on the health check performed on the memory cells of the memory unit, data stored in the memory unit can be refreshed or rewritten to new memory locations.

If the defect scanning component 113 determines that the operating characteristic values do not satisfy any of the threshold criteria, then the defect scanning component 113 can cause the memory sub-system 110 to use a single-read scan operation after each write. To perform the single-read scan operation after each write, the memory sub-system 113 can perform a sequence of write-scan operation pairs, where each write-scan operation pair includes a write operation and a scan operation. The write operation's parameters (e.g., the address of the data to be written, and the memory unit and address at which data is to be written) are specified by one of the write operation requests. The defect scanning component 113 can write data to the memory unit at the specified address. The defect scanning component 113 can cause the memory sub-system 110 to perform the read operation subsequent to the write operation, and can verify that the written data is correctly stored in the respective one of the memory units. Further details relating to the operations of the defect scanning component 113 are described below.

Figure 2A:
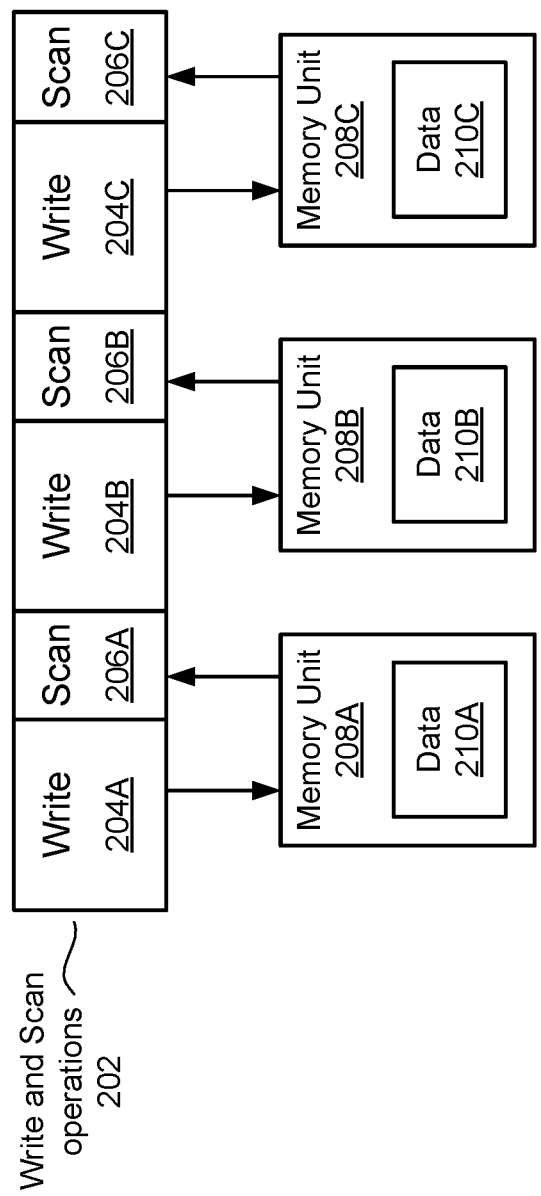
FIG. 2A illustrates an example sequence of write operations and scan operations in which each scan operation is performed subsequent to a respective write operation in accordance with some embodiments.

FIG. 2A illustrates an example sequence 202 of write operations 204 and scan operations 206 in which each scan operation 206 is performed subsequent to a respective write operation 204 in accordance with some embodiments. The write operations 204 and scan operations 206 can be performed by a defect scanning component 113, for example. The sequence 202 alternates between write operations 204 and scan operations 206. Each scan operation 206 can determine whether a respective memory unit 208 has a defect by performing a read operation, e.g., reading data 210 from the respective memory unit 208 and verifying data 210, e.g., using parity data, which can be included in data 210. A first write operation 204A writes first data 210A to a first memory unit 208A. The first write operation 204A is followed by a first scan operation 206A, which can read the first data 210A from the first memory unit 208A and perform verification of first data 210A or other integrity checking operations on memory unit 208A.

A second write operation 204B, which follows the first scan operation 206A, writes second data 210B to a second memory unit 208B. The second write operation 204B is followed by a second scan operation 206B, which can read the second data 210B from the second memory unit 208B and perform verification of second data 210B or other integrity checking operations on memory unit 208B.

A third write operation 204C, which follows the second scan operation 206B, writes third data 210C to a third memory unit 208C. The third write operation 204C is followed by a third scan operation 206C, which can read the third data 210C from the third memory unit 208C and perform verification of third data 210C or other integrity checking operations on memory unit 208C.

Figure 2B:
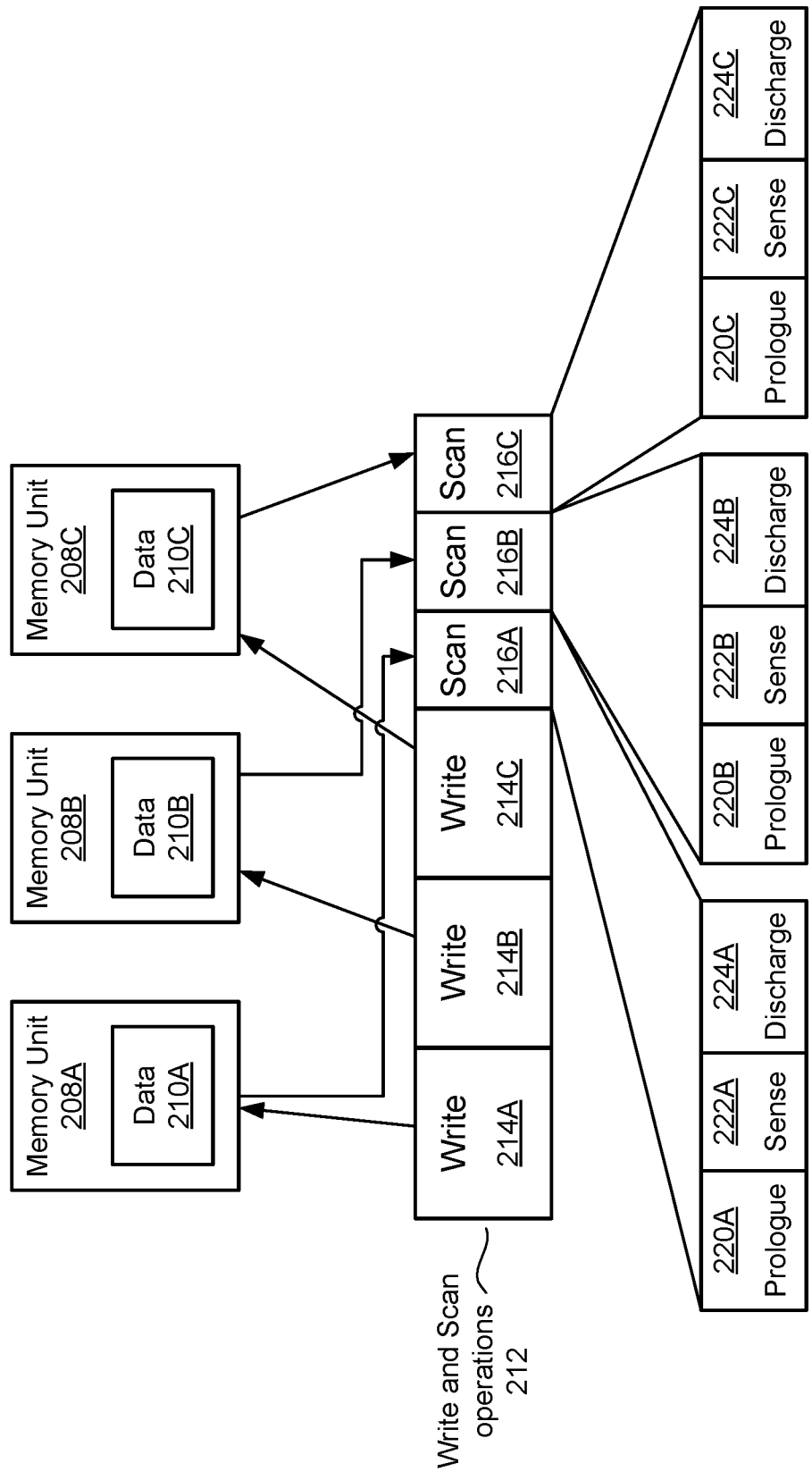
FIG. 2B illustrates example memory access operations in which a sequence of scan operations is performed subsequent to a sequence of respective write operations in accordance with some embodiments.

FIG. 2B illustrates example memory access operations 212 in which a sequence of scan operations 216 is performed subsequent to a sequence of respective write operations 214 in accordance with some embodiments. The write operations 214 and scan operations 216 can be performed by a defect scanning component 113, for example. A first write operation 214A writes first data 210A to a first memory unit 208A. The first write operation 214A is followed by a second write operation 214B, which writes second data 210B to second memory unit 208B. The second write operation 214B is followed by a third write operation 214C, which writes third data 210C to third memory unit 208C. The third write operation 214C is followed by a first scan operation 216A, which can read the first data 210A from the first memory unit 208A and perform verification of first data 210A or other integrity checking operations on memory unit 208A.

The first scan operation 216A is followed by a second scan operation 216B, which can read the second data 210B from the second memory unit 208B and perform verification of second data 210B or other integrity checking operations on memory unit 208B. The second scan operation 216B is followed by a third scan operation 216C, which can read the third data 210C from the third memory unit 208C and perform verification of third data 210C or other integrity checking operations on memory unit 208C.

Each of the scan operation 216 includes a "prologue" (e.g., setup) operation 220, a sense operation 222, and a "discharge" (e.g., clean up) operation 224. Each sense operation 222 reads the respective data 210 data from the respective memory unit 208. The first scan operation 216A includes a first prologue operation 220A, a first sense operation 222A, which reads the first data 210A from the first memory unit 208A, and a first discharge operation 224A. The second scan operation 216B includes a second prologue operation 220B, a second sense operation 222B, which reads the second data 210B from the second memory unit 208B, and a second discharge operation 224B. The third scan operation 216C includes a third prologue operation 220C, a third sense operation 222C, which reads the third data 210C from the third memory unit 208C, and a third discharge operation 224C.

Figure 2C:
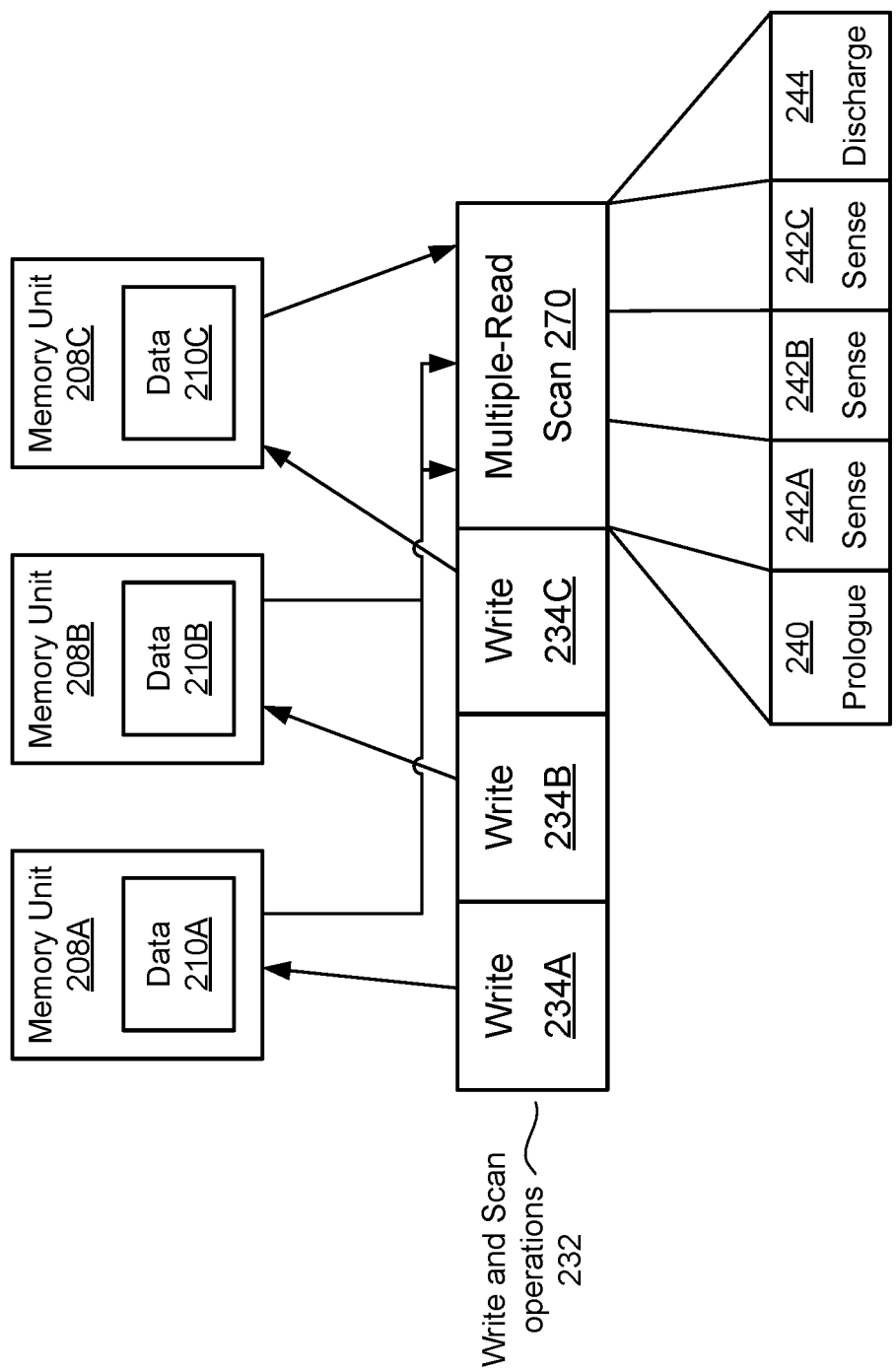
FIG. 2C illustrates example memory access operations in which a sequence of writes to respective memory units is followed by a multiple-read scan operation that includes multiple reads, each of which reads data from a respective one of the memory units, in accordance with some embodiments.

FIG. 2C illustrates example memory access operations 232 in which a sequence of writes 234 to respective memory units 208 is followed by a multiple-read scan operation 270 that includes multiple reads 242 ("sense operations"), each of which reads data 210 from a respective one of the memory units 208, in accordance with some embodiments. The write operations 234 and multiple-read scan operation 270 can be performed by a defect scanning component 113, for example. As shown in FIG. 2C, the defect scanning component 113 can combine two or more separate scan operations that are requested to be performed on different memory units into a single "multiple-read" scan operation. The defect scanning component 113 may identify two or more scan operations in the command queue 152, for example, and combine the two or more scan operations into a single multiple-read scan operation. Thus, instead of performing a scan operation after each write operation, a number N of scan operations that each perform a single read can be replaced with a single multiple-read scan operation 270 that is performed after N write operations and performs N reads. The multiple-read scan operation 270 can determine whether each of the respective memory units 208 has a defect by, for example, performing health checks on data read from each of the memory units 208.

The single multiple-read scan operation 270 can perform N read operations to verify the data written to N memory units (e.g., pages or other addressable memory units) by the N write operations. Combining the scan operations in this way can increase throughput because read prologue and discharge operations can be performed once for two or more reads in the multiple-read scan operation (e.g., one prologue, discharge pair), instead of once for each of the separate scan operations (e.g., N prologue, discharge pairs). Reducing the number of prolog and discharge operations reduces the amount of bandwidth used by the scans and accordingly increases throughput. For example, combining four scan operations into one can reduce the number of setup, clean-up pairs from four to one, which is a reduction by a factor of four. If the latency of each individual read operation is t time units, for example, then combining 4 scan operations into one can reduce the latency from 4t to approximately 3t. The savings of approximately 1t in this example can result from not performing 3 setup and 3 discharge operations. The amount of savings can be a function of setup, sense, and discharge timings, and the number of individual reads merged into a multiple-read scan operation.

However, combining multiple scan operations into a single scan operation 270 can also increase the latency of scan operations, since the scan operation for a write is not performed until after multiple (e.g., N) writes. Accordingly, data written by a write operation can be unavailable for reading by an application until up to N writes and one multiple-read scan operation have been performed, instead of until one write and one single-read scan operation when multiple scan operations are not combined. The increased latency can result in increased response times for operations that involve reading recently-written data. Increased response times can be acceptable for workloads that write data in bursts of writes, since increased throughput can outweigh the drawbacks of increased response time in such applications.

Referring to FIG. 2C, each of the write operations 234 writes respective data 210 to a respective memory unit 208 as described above with reference to FIG. 2B. The third write operation 234C is followed by a multiple-read scan operation 270, which includes three sense operations 242. Each sense operation 242 can read respective data 210 from a respective memory unit, and perform verification of respective data 210 (or other integrity checking operations) on the respective memory unit 208. The first, second, and third sense operations 242A, 242B, 242C can be performed in the sequence shown, or in any other suitable sequence, e.g., sense operation 242B followed by sense operation 242A followed by sense operation 242C.

Multiple-read scan operation 270 includes a prologue operation 240, a first sense operation 242A, a second sense operation 242B, a third sense operation 242C, and a discharge operation 244. The first sense operation 242A can read the first data 210A from the first memory unit 208A and perform verification of first data 210A or other integrity checking on first memory unit 208A. The second sense operation 242B can read the second data 210B from the second memory unit 208B and perform verification of second data 210B or other integrity checking on second memory unit 208B. The third sense operation 242C can read the third data 210C from the third memory unit 208C and perform verification of third data 210C or other integrity checking on third memory unit 208C.

A memory device 130 can include an array of memory cells. The array can include a plurality of strings of series-connected memory cells and a plurality of access lines (e.g., wordlines). Each access line can be connected to a control gate of a respective memory cell of each string of series-connected memory cells of the plurality of strings of series-connected memory cells. As described above, a read operation can be performed using a signal (e.g., applied to a wordline of the memory array) having a read voltage level. A read voltage level can be a particular voltage that is applied to memory cells of the memory device 130 to read the data stored at the memory cells. Thus, memory unit data can be read from each of the respective memory cells coupled to a selected access line (e.g., wordline) of the plurality of access lines.

As described above, to perform a multiple-read scan operation 270, the defect scanning component 113 can perform a prologue operation 240, one or more sense operations 242, and a discharge operation 244. The prologue operation 240 can open an array of memory cells of the memory device 130 for multiple read operations by, for example, increasing the voltage of each access line from a reference voltage to a voltage sufficient to activate each respective cell coupled to each respective access line of the array of memory cells. A first sense operation 242A can read first data from respective memory cells coupled to a selected one of the access lines, e.g., by adjusting the voltage level of the selected access line to sense the first data of the respective memory cells.

A second sense operation 242B can read second data from respective memory cells coupled to the selected one of the access lines, e.g., by adjusting the voltage level of the selected access line to sense the second data of the respective memory cells. The second sense operation 242B need not reduce the voltage applied to an unselected access line after reading the first data. Similarly, a third sense operation 242C can read third data from respective memory cells coupled to the selected one of the access lines, e.g., by adjusting the voltage level of the selected access line to sense the third data of the respective memory cells. The third sense operation 242C need not reduce the voltage applied to an unselected access line after reading the first data.

The discharge operation 244 can close the array of memory cells subsequent to reading the respective data from each of the respective memory cells. The discharge operation 244 can close the array of memory cells by, for example, increasing the voltage of each access line to a voltage sufficient to activate each respective memory cell coupled to each access line, then reducing the voltage of each access line to the reference voltage.

Figure 3:
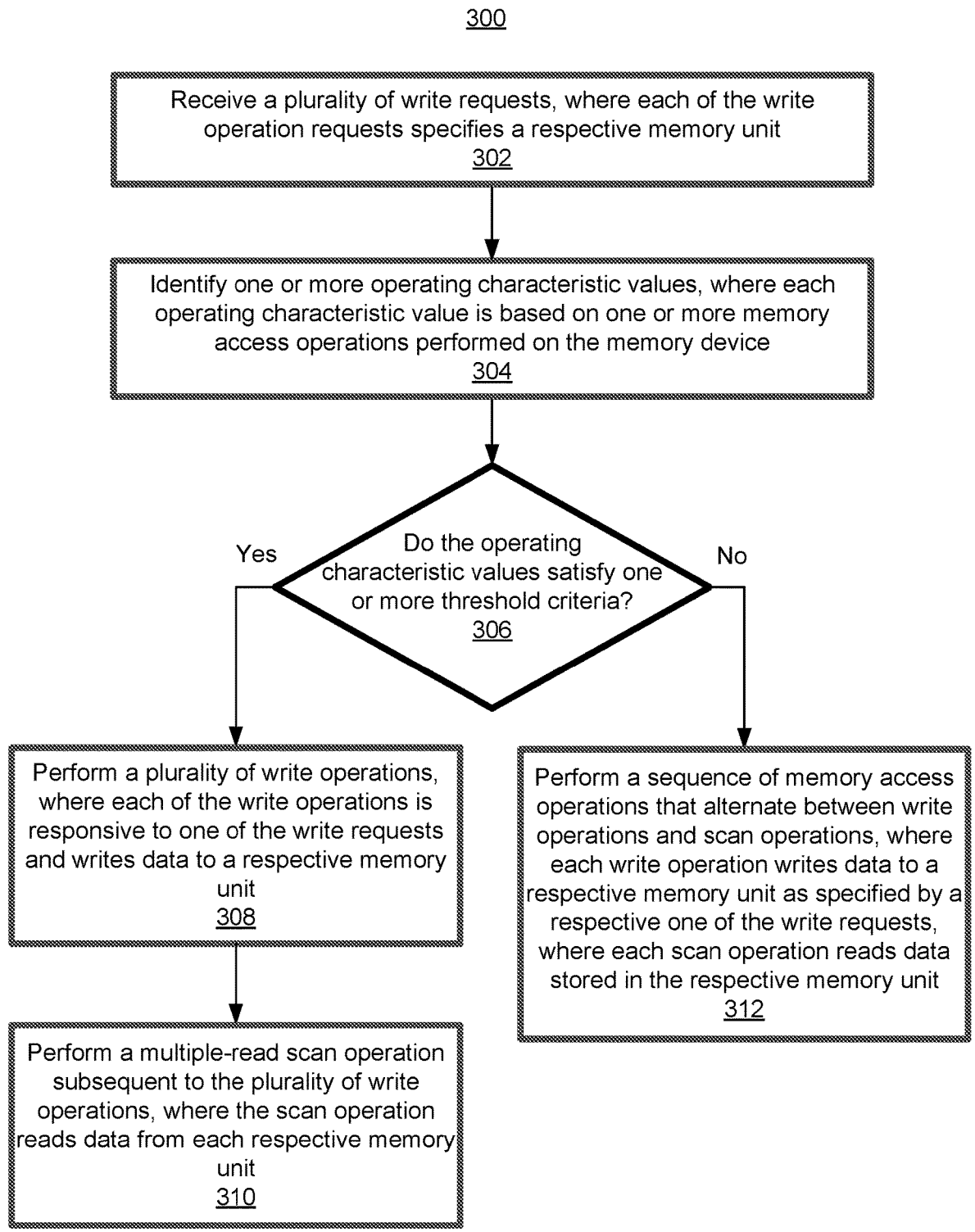
FIG. 3 is a flow diagram of an example method that performs a multiple-read scan operation subsequent to a sequence of write operations if one or more characteristics of a memory sub-system workload satisfy threshold criteria, in accordance with some embodiments.

FIG. 3 is a flow diagram of an example method 300 that performs a multiple-read scan operation subsequent to a sequence of write operations if one or more characteristics of a memory sub-system workload satisfy threshold criteria, in accordance with some embodiments. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the defect scanning component 113 of FIG. 1. The method 300 can be performed by the defect scanning component 113 for each write command, e.g., when each write command is de-queued from the command queue 152, so that the defect scanning component 113 can determine whether to perform a multiple-read scan operation for each write command (e.g., if each write command can specify multiple write requests specifying that data be written to multiple pages). Alternatively or additionally, the method 300 can be performed by the defect scanning component 113 for every Nth write request, e.g., if each write command corresponds to or includes one write request, where N is a predetermined number of write requests, or after a predetermined amount of time has passed since the method 300 was previously performed.

Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 302, the processing logic receives a plurality of write requests, where each of the write operation requests specifies a respective memory unit. At operation 304, the processing logic identifies one or more operating characteristic values, where each operating characteristic value is based on one or more memory access operations performed on the memory device. The operating characteristics can include a number of sequential Logical Block Addresses (LBAs), a queue depth, a transfer size, or a total amount of data associated with pending write requests in the command queue. These operating characteristics can be determined by monitoring a memory sub-system command queue 152 through which write operations pass, for example. The number of sequential LBAs can be a count of how many consecutive write operations specify LBAs that correspond to logical blocks stored at sequential memory addresses. The queue depth can be a number of commands in the command queue 152, and the transfer size can be a measure of how much data is written by each write operation, or a measure of an amount of data written over a specified period of time by one or more write operations. The total amount of data associated with pending write requests in the command queue can be, for example, a sum of the write transfer size of each write command in the command queue at a particular time. The particular time can be the current time at which the operating characteristic value is identified, for example. Although particular operating characteristics are described herein, any suitable operating characteristics may be used.

At operation 306, the processing logic determines whether the operating characteristic values satisfy one or more threshold criteria. If the operating characteristic values satisfy at least one of the threshold criteria, then the workload can be characterized by bursts of writes. Otherwise, if the operating characteristic values do not satisfy any of the threshold criteria, then the workload can be characterized by slower rates of writes. The operating characteristic values can satisfy one or more threshold criteria if, for example, at least one of the operating characteristics exceeds an associated threshold value, such as a threshold number of sequential LBAs, a threshold queue depth, or a threshold transfer size.

Relatively large numbers of writes to sequential LBAs can indicate that the workload is characterized by bursts of writes, since bursts of writes can involve writing substantial amounts of data to sequential logical or physical addresses. The workload can be characterized by bursts of writes if, for example, the number of sequential LBAs is at least a threshold number of sequential LBAs. The threshold number of sequential LBAs can correspond to a threshold amount of data written to sequential LBAs, since each LBA can correspond to a specific amount of data (e.g., a block size). For example, 100 LBAs can correspond to 400 kilobytes of data, so if the threshold number of sequential LBAs is 100, then the threshold criteria can be satisfied if the number of sequential LBAs is at least 100, or if the amount of data written to sequential LBAs is at least 400 kilobytes.

A relatively large queue depth can indicate that the workload is characterized by bursts of writes, since bursts of writes can involve performing multiple write operations concurrently, and larger queue depths can indicate that multiple concurrent write operations are being performed. A relatively large transfer size can indicate that the workload is characterized by bursts of writes, since bursts of writes can involve transferring relatively large amounts of data. Queue depth and transfer size can be combined into one criterion by multiplying queue depth by transfer size.

The operating characteristic values can be for a period of time, e.g., a specified number of seconds, hours, or days, or for a specified amount of data. For example, the number of sequential LBAs can be a number of sequential LBAs in a specified amount of data, such as 10 megabytes. As another example, the transfer size can be an amount of data written within a specified interval, such as the previous 180 seconds. The queue depth can be an average, maximum, or minimum number of write commands in the command queue 152 over a specified period of time, e.g., 30 seconds. The threshold values can be determined using empirical data and/or media characterization information. For example, the threshold transfer size can be determined based on a historical observation that a host issues write commands above a certain transfer size when large files are written.

If the operating characteristic values satisfy one or more threshold criteria, then the processing logic uses a multiple-read scan after a sequence of consecutive writes performing operations 308 and 310. At operation 308, the processing logic performs a plurality of write operations. Each of the write operations is responsive to one of the write requests and writes data to a respective memory unit. The plurality of write operations can be, for example, the write operations 234A-234C of FIG. 2C. The number of operations in the plurality of write operations can be, e.g., the number N that determines how frequently the method 300 is executed, or other suitable value, e.g., the number of read operations that can efficiently be performed by a multiple-read scan operation, or a maximum number of read operations that can be performed by a multiple-read scan operation. At operation 310, the processing logic performs a defect scan operation subsequent to the plurality of write operations. The defect scan operation reads data from each respective memory unit. The defect scan operation can be, for example, the multiple-read scan operation 270 of FIG. 2C.

If at operation 306 the processing logic determines that the operating characteristic values do not satisfy one or more threshold criteria, then at operation 312, the processing logic uses a per-write scan after each write. More specifically, at operation 312, the processing logic performs a sequence of memory access operations that alternate between write operations and scan operations, where each write operation writes data to a respective memory unit as specified by a respective one of the write requests. Each scan operation reads data stored in the respective memory unit. The sequence of memory operations performed at operation 312 can be, for example, the sequence of write and scan operations 202 of FIG. 2A.

Figure 4:
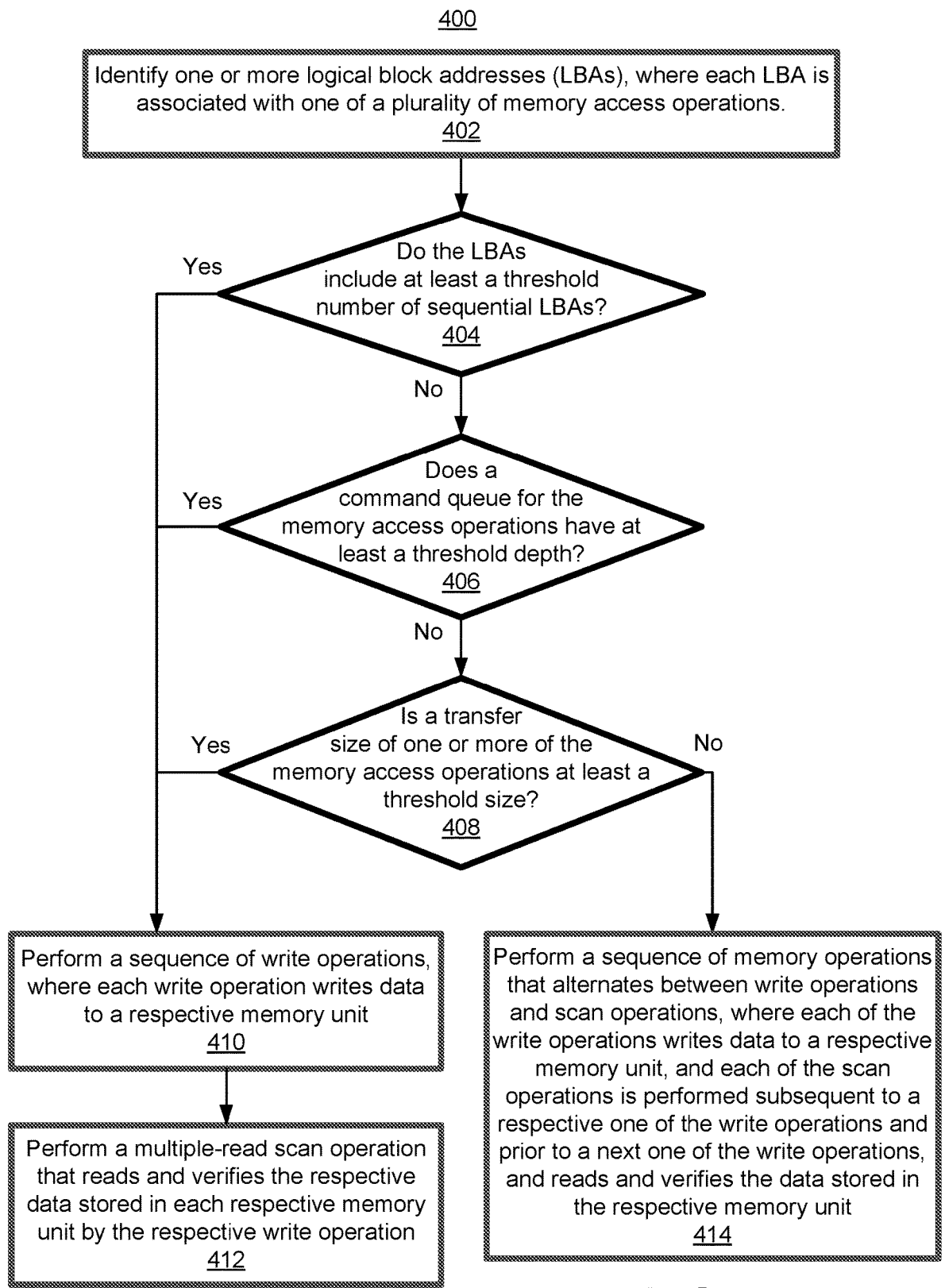
FIG. 4 is a flow diagram of an example method that performs a multiple-read scan operation subsequent to a sequence of write operations if one or more characteristics based on memory access operations satisfy threshold criteria, or otherwise performs a sequence of memory operations that alternates between write operations and scan operations, in accordance with some embodiments.

FIG. 4 is a flow diagram of an example method 400 that performs a multiple-read scan operation subsequent to a sequence of write operations if one or more characteristics based on memory access operations satisfy threshold criteria, or otherwise performs a sequence of memory operations that alternates between write operations and scan operations, in accordance with some embodiments.

The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the defect scanning component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 402, the processing logic identifies one or more logical block addresses (LBAs). Each LBA can be associated with one of a plurality of memory access operations. At operation 404, the processing logic determines whether the LBAs include at least a threshold number of sequential LBAs. If so, the processing logic performs operations 410 and 412, as described below. If not, the processing logic performs operation 406. The number of sequential LBAs can be a count of how many consecutive write operations specify LBAs that correspond to logical blocks stored at sequential memory addresses.

The number of sequential LBAs can be determined by monitoring a command queue 152, for example. The processing logic can de-queue each command from the command queue and perform an action (e.g., read or write) specified by the command. The count of consecutive write operations can be determined by incrementing a counter variable for each dequeued write command that specifies a destination address that is the next sequential address following a destination address specified by the previously-dequeued write command. If the dequeued write command specifies a destination address that is not the next sequential address following the destination address specified by the previously-dequeued write command, then the counter can be set to zero. The next sequential address can be, e.g., the next address in memory following the last (e.g., highest) memory address at which data was stored by the previous write command. For example, if a first write command writes 64 bytes to address 1024, then the next sequential address is 1024+64=1088. If a second write command subsequently writes 32 bytes to address 1088, then two sequential write operations have been performed. Further, if the threshold number of sequential LBAs is 2, then the LBAs include at least the threshold number of sequential LBAs in this example, and the threshold criterion (based on the number of sequential LBAs) is satisfied. Alternatively, if the second write command subsequently writes the 32 bytes to address 2048, then the second write command is not a sequential write command, and no sequential write operations have been performed. Further, if the threshold number of sequential LBAs is 2, and the second write command is not a sequential write command, then the LBAs do not include at least the threshold number of sequential LBAs, and the threshold criterion is not satisfied.

In another example, at operation 404, the processing logic can determine whether the LBAs of memory access operations, for which the total amount of memory accessed is at least a threshold size, include at least a threshold number of sequential LBAs. The threshold size can be determined empirically, and can be, e.g., 5 megabytes, 10 megabytes, 32 megabytes, or other suitable value. For example, if a first write command writes 4 megabytes, and a second write command subsequently writes 2 megabytes to the next sequential address, then two sequential write operations have been performed, and the total amount of memory accessed is 6 megabytes. If the threshold size is 5 megabytes, and the threshold number of sequential LBAs is 2, then the threshold criteria (based on the total amount of memory accessed and number of sequential accesses) is satisfied. Alternatively, if the threshold size is 10 megabytes, and the threshold number of sequential LBAs is 2, then the threshold criteria (based on the total amount of memory accessed and number of sequential accesses) is not satisfied. Although particular of the number of sequential LBAs and the threshold sizes are described in the examples herein, the number of sequential LBAs and the threshold size can have any suitable values.

At operation 406, the processing logic determines whether a command queue 152 for the memory access operations has at least a threshold depth. In one example, the depth of the command queue can be the number of commands in the command queue. In another example, the depth of the command queue can be a maximum number of commands permitted in the command queue (e.g., a capacity of the command queue). The command queue can have at least the threshold depth if, for example, the number of commands in the command queue is at least the threshold depth. If the threshold depth is 32 elements, for example, and the command queue contains 50 commands (e.g., write commands), then the command queue has at least the threshold depth, and the queue depth criterion is satisfied. Alternatively, if the threshold depth is 32 elements, and the command queue contains 30 elements, then the command queue does not have at least the threshold depth, and the queue depth criterion is not satisfied. If the processing logic determines that the command queue 152 has at least the threshold depth, the processing logic performs operations 410 and 412, as described below. Otherwise, the command queue 152 does not have at least the threshold depth, and the processing logic performs operation 408. The values given herein for the queue depth and threshold depth are examples. In other example, the transfer sizes and threshold transfer size can have any suitable values.

At operation 408, the processing logic determines whether a transfer size of one or more of the memory access operations is at least a threshold size. If the transfer size of one or more of the memory access operations is at least a threshold size, the processing logic performs operations 410 and 412, as described below. If the transfer size of one or more of the memory access operations is not at least the threshold size, the processing logic performs operation 414. The transfer size can be a measure of how much data is written by each write operation, or a measure of an amount of data written over a specified period of time by one or more write operations, or other suitable measure of transfer size (e.g., an average amount of data written by one or more write operations). The specified time can be, e.g., a specified number of seconds, e.g., the previous 10 seconds before operation 408 is performed, or 30 seconds, 180 seconds, or other suitable value. The threshold transfer size can be determined experimentally, e.g., based on a historical observation that a host issues write commands above a certain transfer size when large files are written. The transfer size of a particular memory access operation (e.g. read or write) can be, e.g., a value such as 4 kilobytes, 16 kilobytes, 8 megabytes 32 megabytes, or other suitable value. The threshold transfer size can be, e.g., 2 megabytes. As an example, if the transfer size for a particular write operation is 16 megabytes, and the threshold transfer size is 2 megabytes, then the transfer size criterion is satisfied. The values given herein for the transfer size are examples. In other example, the transfer sizes and threshold transfer size can have any suitable values.

At operation 410, if at least one the criteria of operations 404, 406, 408 is satisfied, the processing logic performs a sequence of write operations. Each write operation writes data to a respective memory unit. The sequence of write operations can be, for example, the sequence of write operations 234A-234C of FIG. 2C. In one example, the processing logic can determine the number of write operations to be performed in the sequence based on a predetermined configuration parameter, e.g., 8, 16, or 32 write operations, or if the command queue contains a sufficient number of consecutive write operations that can be combined into a multiple-read scan operation. In another example, the processing logic can determine the number of write operations to be performed in the sequence based on the number of consecutive write operations in the queue that can be combined into a multiple-read scan operation (e.g., specify memory addresses that can be accessed in a single multiple-read scan operation).

At operation 412, the processing logic performs a multiple-read scan operation that reads and verifies the respective data stored in each respective memory unit by the respective write operation. The multiple-read defect scan operation can be, for example, the multiple-read scan operation 270 of FIG. 2C. The number of read operations in the multiple-read scan operation can correspond to the number of write operations performed in the sequence of operation 410.

At operation 414, if none of the criteria of operations 404, 406, 408 is satisfied, the processing logic performs a sequence of memory operations that alternates between write operations and scan operations. Each of the write operations writes data to a respective memory unit, and each of the scan operations is performed subsequent to a respective one of the write operations and prior to a next one of the write operations, and reads and verifies the data stored in the respective memory unit. The sequence of memory operations performed at operation 414 can be, for example, the sequence of write and scan operations 202 of FIG. 2A. In other examples, at operation 414 the processing logic can perform any suitable sequence of memory operations, such as the sequence of write and scan operations 212 of FIG. 2B.

Figure 5:
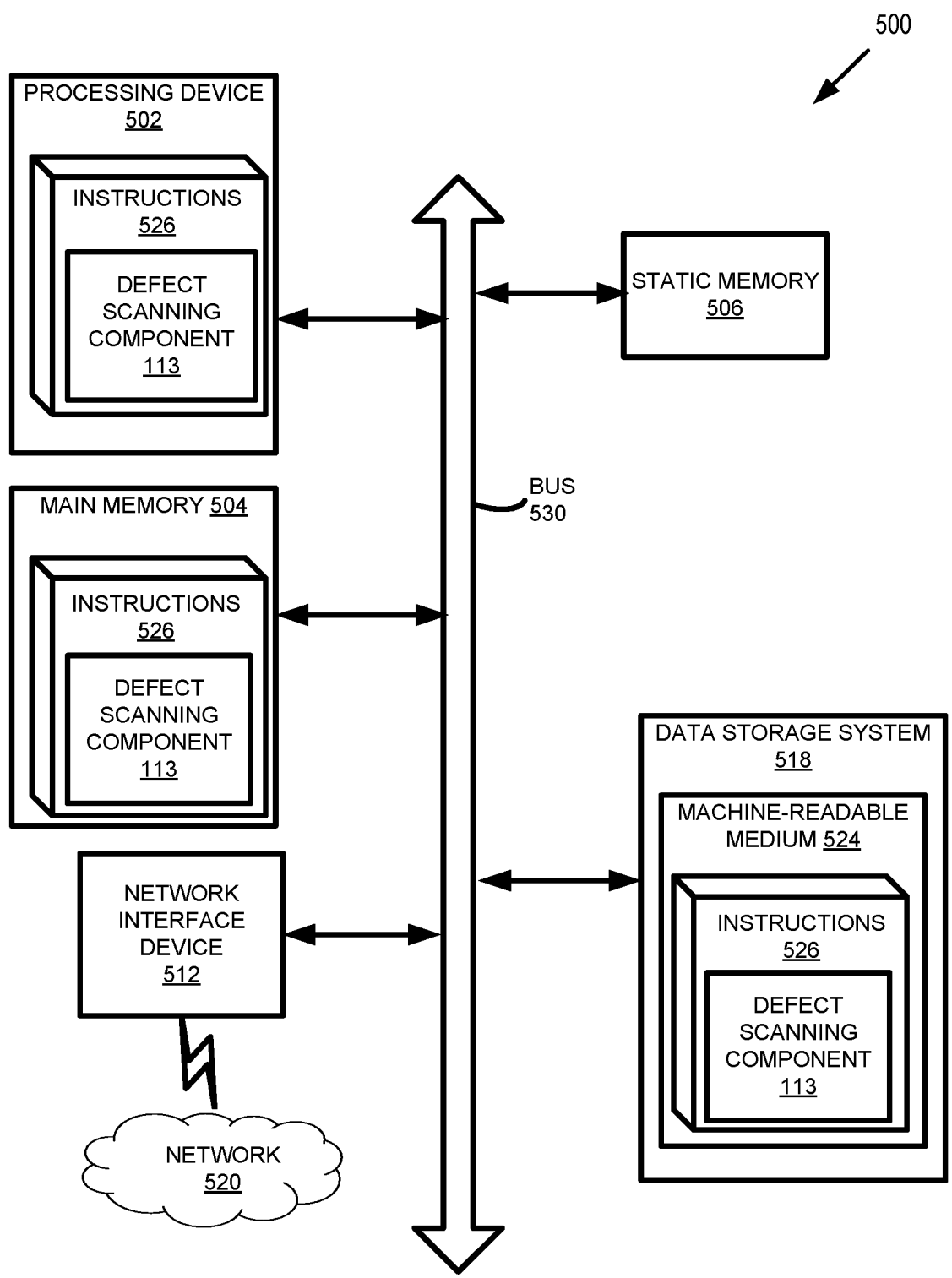
FIG. 5 is a block diagram of an example computer system in which implementations of the present disclosure can operate.

FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to a read voltage adjustment component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, digital or non-digital circuitry, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage system 518, which communicate with each other via a bus 530.

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one embodiment, the instructions 526 include instructions to implement functionality corresponding to a read voltage adjustment component (e.g., the read voltage adjustment component 113 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
    a memory device comprising a plurality of memory units; and
    a processing device, operatively coupled to the memory device, to perform processing operations comprising:
        identifying one or more operating characteristic values of the memory device;
        determining whether the one or more operating characteristic values satisfy one or more threshold criteria; and
        responsive to determining that the one or more operating characteristic values satisfy the one or more threshold criteria:
            performing a plurality of write operations on the plurality of memory units, wherein each of the plurality of write operations writes corresponding data to a respective one of the plurality of memory units, and
            performing a multiple-read scan operation subsequent to the plurality of write operations, wherein the multiple-read scan operation reads data from each of the plurality of memory units.

2. The system of claim 1, wherein the one or more operating characteristic values comprise a plurality of logical block addresses, wherein each logical block address is associated with one of the plurality of write operations, and wherein the one or more threshold criteria are based on how many of the logical block addresses are sequential logical block addresses.

3. The system of claim 2, wherein the one or more operating characteristic values satisfy the one or more threshold criteria if the plurality of logical block addresses comprises at least a threshold number of sequential logical block addresses.

4. The system of claim 1, wherein the one or more operating characteristic values comprise a depth of a queue of memory access commands.

5. The system of claim 4, wherein the one or more operating characteristic values satisfy the one or more threshold criteria if the depth of the queue is at least a threshold depth.

6. The system of claim 1, wherein the one or more operating characteristic values comprise at least one data transfer size associated with at least one of the plurality of write operations.

7. The system of claim 6, wherein the one or more operating characteristic values satisfy the one or more threshold criteria if the data transfer size is at least a threshold data transfer size.

8. The system of claim 6, wherein the one or more operating characteristic values further comprise a depth of a queue of memory access commands, and the one or more threshold criteria are based on a product of the data transfer size and the depth of the queue.

9. The system of claim 1, wherein the multiple-read scan operation determines whether each of the memory units has a defect.

10. The system of claim 1, wherein performing the multiple-read scan operation comprises:
    opening an array of memory cells of the memory device for multiple read operations;
    reading respective memory unit data from each of the memory cells; and
    closing the array of memory cells subsequent to reading the respective memory unit data from each of the memory cells.

11. The system of claim 10, the memory device comprising:
    the array of memory cells, wherein the array of memory cells comprises a plurality of strings of series-connected memory cells; and
    a plurality of access lines, wherein each access line of the plurality of access lines is connected to a control gate of a respective memory cell of each string of series-connected memory cells of the plurality of strings of series-connected memory cells,
    wherein the memory unit data is read from each of the respective memory cells, and the respective memory cell from which the memory unit is read is coupled to a selected one of the plurality of access lines.

12. The system of claim 1, wherein the write operations are performed consecutively.

13. The system of claim 1, the processing operations further comprising:
    responsive to determining that the one or more operating characteristic values do not satisfy the one or more threshold criteria, performing a sequence of write-scan operation pairs, wherein each write-scan operation pair comprises a write operation and a scan operation, wherein the write operation writes data to the respective one of the plurality of memory units, and wherein the scan operation is performed subsequent to the write operation and verifies the data written to the respective one of the plurality of memory units.

14. A method comprising:

identifying one or more operating characteristic values of a memory device;

determining whether the one or more operating characteristic values satisfy one or more threshold criteria; and responsive to determining that the one or more operating characteristic values satisfy the one or more threshold criteria:

performing a plurality of write operations on a plurality of memory units of the memory device, wherein each of the plurality of write operations writes corresponding data to a respective one of the plurality of memory units, and performing a multiple-read scan operation subsequent to the plurality of write operations, wherein the multiple-read scan operation reads data from each of the plurality of memory units.

15. The method of claim 14, wherein the one or more threshold criteria comprise a minimum data rate criterion.

16. The method of claim 14, wherein the one or more threshold criteria comprise a threshold amount of data.

17. The method of claim 14, wherein the one or more threshold criteria comprise a threshold amount of time.

18. The method of claim 14, wherein the one or more threshold criteria is based on one or more of a number of sequential logical block addresses written to the memory device, a data transfer size of data written to the memory device, a queue depth of a command queue that comprises pending write requests, or a total amount of data associated with pending write requests in the command queue.

19. A non-transitory computer readable medium comprising instructions, which when executed by a processing device, cause the processing device to perform processing operations comprising:

identifying one or more operating characteristic values of a memory device;

determining whether the one or more operating characteristic values satisfy one or more threshold criteria; and responsive to determining that the one or more operating characteristic values satisfy the one or more threshold criteria:

performing a plurality of write operations on a plurality of memory units of the memory device, wherein each of the plurality of write operations writes corresponding data to a respective one of the plurality of memory units, and performing a multiple-read scan operation subsequent to the plurality of write operations, wherein the multiple-read scan operation reads data from each of the plurality of memory units.

20. The non-transitory computer readable medium of claim 19, wherein the one or more threshold criteria is based on one or more of a number of sequential logical block addresses written to the memory device, a data transfer size of data written to the memory device, or a queue depth of a command queue that comprises pending write requests.

\* \* \* \* \*